Jan. 22, 1946.  W. J. LEWIS  2,393,388

OVERHEAD TROLLEY SYSTEM AND FROG

Filed Nov. 25, 1943

Inventor
WARREN J. LEWIS

By Alfred F. Dees
Attorney

Patented Jan. 22, 1946

2,393,388

UNITED STATES PATENT OFFICE 2,393,388

OVERHEAD TROLLEY SYSTEM AND FROG

Warren J. Lewis, Mansfield, Ohio, assignor to The Ohio Brass Company, Mansfield, Ohio, a corporation of New Jersey Application November 25, 1943, Serial No. 511,743

11 Claims. (Cl. 191—38)

This invention is directed to an overhead trolley switching system and frog therefor in their more particular aspects concerns a system and a frog having very rapid and dependable operating characteristics.

One object of this invention is to provide a trolley frog having a control circuit for a solenoid operated tongue shifting mechanism that is extremely sensitive, positive and unfailing in operation and depending for its actuation upon the longitudinal position of the current collectors relative to each other along the trolley wire.

Another object of the invention is to provide a trolley frog in which the energization of the shifting mechanism is made continuous at each operation of the frog for a predetermined time depending upon the length of the contactors and the vehicle speed.

A still further object of the invention is to provide a trolley frog in which the tongue shifting mechanism is provided with relay means to control the length of time of energization of the operating coils thereof and having means to produce a brief current surge through the operating coil for the relay in order to increase the speed of and the effective time of energization of the relay coil.

Another object of the invention is to provide a trolley frog having a tongue shifting mechanism including means to apply to the operating coil or coils, upon energization thereof, an instantaneous surge of current of brief duration and of sufficient magnitude whereby instantaneous operation of the tongue shifting mechanism is effected.

A still further object of the invention is to provide a condenser circuit in a trolley frog mechanism to increase the speed of operation of the tongue shifting coils.

Another object of the invention is to provide a trolley frog having a control circuit for the tongue operating mechanism and having a relatively low initial resistance to produce a high instantaneous current surge in the control circuit and which resistance increases rapidly after energization to provide a lower holding current.

Other and still further objects of the invention will occur to those skilled in the arts to which this invention pertains as the description proceeds which taken in connection with the accompanying drawings sets forth a preferred embodiment and a selected modification thereof but such disclosures are not to be construed as a limitation of the invention which is limited only by the appended claims and any and all modifications, alterations and variations of structure coming within the spirit and scope thereof are deemed to be included herein.

Prior art frog mechanisms of the automatic type have certain inherent factors that affect their speed of operation, viz., the time the tongue operating circuit is energized by the vehicle and the magnetic characteristics of the circuit. The second factor is improvable by the use of more powerful and even overloaded coils. There are dangers in this expedient, with frequent coil burnouts which may be caused by the vehicle stopping with its current collectors on the contactors or traversing them to slowly. With suitable precautions this expedient is feasible up to a certain point in solenoid construction but when the turns are increased there is also an increase in inductance which has the adverse tendency to retard or slow down coil action and the operation of the tongue mechanism.

In prior art devices the time factor or length of time the energizing circuit is closed varies inversely as the speed of the vehicle and directly as the effective length of the trolley contactors.

The speed of travel of the vehicle may be increased over that allowable by present-day devices by the employment of relays. One such organization is set forth in applicant's co-pending application S. N. 437,556, filed April 3, 1942. The instant disclosure is an improvement over my prior disclosure and sets forth a mode of operation that allows a more rapid vehicle speed through the frog and employs a control circuit that is more sensitive and which is absolutely reliable in its operation as long as there are no mechanical impediments hindering the operation of the tongue shifting mechanism.

Figure 1:
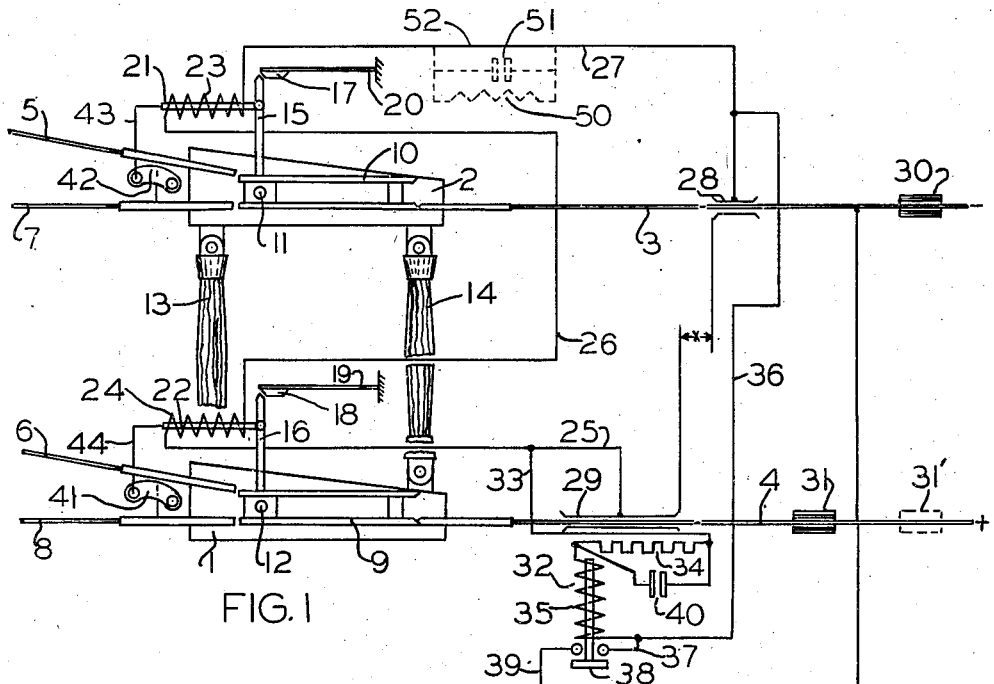
Fig. 1 shows a preferred embodiment of the trolley frog operating mechanism.

The objects and advantages enumerated above are achieved in a device generally disclosed in Fig. 1 in which 1 and 2 are pan elements to one end of which approach trolley wires 3 and 4 of opposite polarity are secured by means of appropriate fittings and at the other end turnoff trolley wires 5 and 6 and straight through trolley wires 7 and 8 are secured by means of appropriate fittings. Pivotally mounted on each pan element 1 and 2 are tongue elements 9 and 10, preferably of the double runner variety. Pins 11 and 12 provide the pivoting connection between tongue and pan elements and pivot with the tongue. Proper spacing between the pan elements is maintained by means of insulator elements 13 and 14 each pivotally connected to the respective pan elements. The foregoing is conventional structure common to a large variety of trolley frogs.

Each of the pin elements 11 and 12 has secured thereto at its one end lever arms 15 and 16 respectively which are movable with the pins 11 and 12 and with the attached tongue. By moving or rotating the levers 15 and 16 the pins 11 and 12 will rotate and shift the runners of the tongues to the straight through or curve position to thereby line up trolley wires 3 and 4 with either of wire pairs 5 and 6 or 7 and 8.

The spring pressed detents 17 and 18 secured to spring elements 19 and 20 preferably are anchored to the frog pans 1 and 2 and maintain the levers 15 and 16 in either selected adjusted position. The faces of the detents are slanted or chamfered as shown and engage with one of the faces on the pointed end of levers 15 and 16. A tilting or lifting of the detents 17 and 18 by the levers 15 and 16 respectively allows levers 15 and 16 to pass underneath them from one position to the other.

Pivotally secured to the levers 15 and 16 are plunger elements 21 and 22 of the coils 23 and 24. These coils are shown as of the single acting variety and rotate the associated tongue and lever elements 9, 10 and 15, 16 in one direction only. The coils are preferably connected in series by means of conductors 25, 26 and 27 but will operate if connected in parallel. The conductors 27 and 25 are directly connected to the contact devices 28 and 29 respectively in the manner shown. It is evident therefore that when the collectors 30 and 31 are both in engagement with the contact devices 28 and 29 at the same time, the coils will be energized to thereby rotate arms 15 and 16 and their respective pins 11 and 12 and attached tongues. Since the tongues are normally set for straight through operation the shifting by the coils when energized will be to curve or turnoff position. The contact devices 28 and 29 are preferably spaced from the pans 1 and 2 on the approach side thereof.

Under some conditions of operation the above circuit may be adequate as for instance in the case of a low vehicle speed. When the vehicle on which collectors 30 and 31 are carried travels at high rate of speed the tongues 9 and 10 may not be shifted in time to properly guide the collectors.

The relay 32 and circuit shown provides means for the completion of the shifting of the tongue elements in ample time thereby accommodating a rapidly traveling vehicle. The relay circuit comes into play as soon as the collectors 30 and 31 engage contact devices 28 and 29 respectively. As soon as collectors 30 and 31 are in engagement with both contact devices 28 and 29 thus energizing the same, relay 32 is energized and closed as long as collector 31 engages contact device 29 by means of the conductor 33 connected to resistance unit 34 in turn directly connected to the coil 35 of relay 32, and thence by conductor 36 connected to the contact device 28.

With frog construction as of today, one of the collection devices on a vehicle traveling at higher than normal speeds through the frog would pass at least one of the contact devices before the operating coils become energized or sufficiently energized to effect a shifting of the tongues. However, with the use of relay 32, the collector 30 may pass the contactor 28 but the tongue operating coils will remain energized as long as relay 32 remains closed which is until collector 31 has passed contact device 29 since the conductors 36 and 37 are indirectly connected to the trolley wire 4, relay contact element 38 and conductor 39 which is directly connected to trolley wire 3. As long as collector 31 is in engagement with contact device 29 after collector 30 has engaged contact device 28, the relay will be energized thereby providing a longer period of energization of coils 23 and 24 than in frogs of today.

By constructing the tongue shifting mechanism and the relay parts 38 with low inertia plungers, just the briefest period of contact between the collectors and the contact devices 28 and 29 will bring relay 32 into play and assist in making certain the energization and the shifting of tongues 9 and 10. It is evident then, that the length of contact device 29 and the speed of the vehicle determine the length of the time coils 23 and 24 are energized.

Merely as an example and not as a limitation the coil 35 may be so constructed as to permit a somewhat greater current flow therethrough than is safe for prolonged energization if connected directly to the contact devices. This greater current would bring the coil up to full energization quickly upon closing its circuit and effect a quick operation of the relay. This greater current is reduced to a safe value for prolonged energization as when the vehicle stops with the collectors on the contact devices by the use of resistance 34.

This resistance 34 will protect the coil 35 from damage due to overheating under continued energization but under certain operating conditions the relay switch will not respond quick enough.

By connecting the condenser 40 across the terminals of the resistance 34, the effect is that of a parallel circuit of low resistance to the resistance 34 for a very brief period of time at the instant the coil energizing circuit is closed, thereby causing a greater current or current surge to flow through the coil for an instant than allowed by the resistance 34, thereby bringing the coil energization up to full value instantly.

As soon as the condenser has functioned the resistance 34 functions to reduce the current flow to its predetermined safe value but sufficient to maintain the energization of coil 35.

After the passage of the collectors 30 and 31 past the tongues, reset mechanisms 41 and 42 respectively connected to plungers 22 and 21 by means of linkages 43 and 44, schematically shown, restore the tongues 9 and 10 to their normal or straight through position when engaged by the passing current collectors.

When it is desired to continue straight through the frog mechanisms there will, of course, be no tongue shifting necessary. In this event it is desirable that neither the coil 35 nor relay operating circuit be closed and therefore collector 30 will have been disengaged from contact device 28 before collector 31 engages contact device 29. In order to accomplish this the distance X must be as long or longer than the length of collector 30.

During operation when both contact devices 28, 29 are engaged by collectors 30, 31 respectively at the same time, relay 32 is energized as previously explained, and is maintained energized as long as collector 31 and contact device 29 remain in engagement. The energizing circuit for coils 23 and 24, after the brief initial engagement of both collectors with both contactors, will now comprise collector 31, contactor device 29, conductor 25, coil 24, conductor 26, coil 23, conductor 27, conductors 36 and 37, relay contact element 38 and conductor 39 to trolley wire 3. The full line positions 30 and 31 of the collector indicate their relative position during a turning of the vehicle and the full line position of collector 30 and the dotted line 31' of collector 31 in transversely disposed alignment indicates the straight through position of the collectors 30 and 31'. No coil operation will be and is necessary for straight through operation.

Figure 2:
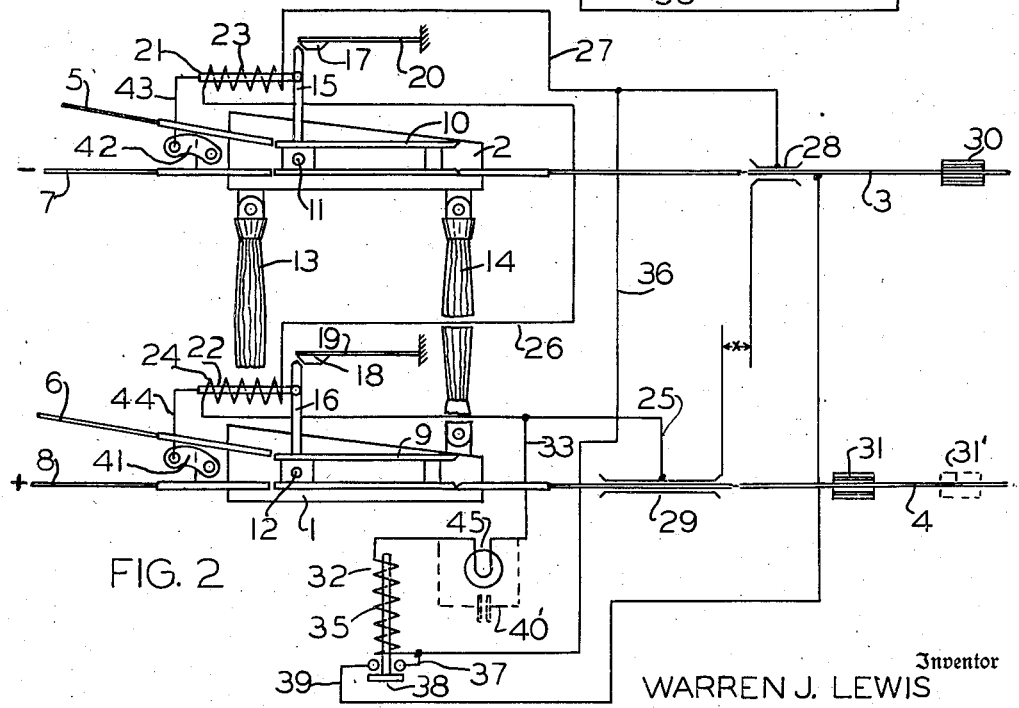
Fig. 2 shows a modified control circuit for the mechanism of Fig. 1.

The modified disclosure shown in Fig. 2 is identical in every respect to that of Fig. 1 except that a tungsten lamp 45 has replaced the resistance unit 34. The resistance characteristic of the tungsten filament is employed here to secure a high speed operation of relay 32. It is known that the cold resistance of a tungsten filamented lamp is very low and its hot resistance almost ten times greater than the cold resistance. By carrying out the same principle in designing the coil as in the case of Fig. 1 and upon closing the coil energizing circuit which includes the filament 45 there is a momentary current surge through the relay 32. This surge is depended upon to actuate relay 32 very rapidly which is materially reduced almost instantly upon the full heating of the lamp filament. A condenser 40' as shown in dotted lines may be employable when ultra high speed is desired but is not so important as in Fig. 1. The operation of the relay 32 and the coil circuits for the tongue shifting mechanism is identical with that described above with reference to Fig. 1.

As an example and not as a limitation, in case of Fig. 2, the resistance of the coil 35 may be 1,000 ohms which on a 600 volt circuit will permit a flow of current of .6 ampere which would be destructive to the coil in a very short time. The cold value of the resistance 45 may be 2,000 ohms which with the resistance of the coils amounts to 3,000 ohms and permits a surge of current of .2 ampere which would give a rapid energization of the coil but would still be too great for a continued flow beyond a minute or two. But the value of the resistance 45 will immediately increase to possibly 20,000 ohms, thus reducing the current flow to .028 ampere, a safe value. In the case of Fig. 1 the resistances 34 and 50 are of Nichrome or similar material, hence the change from cold to hot resistance is slow and is very small compared to the element 45 as described, therefore the use of condensers is advisable.

The several disclosures show a frog pan organization in which the tongues are normally set for straight through operation. It is clear that by proper arrangement of the contact devices 28 and 29 and reset levers 41 and 42, this same system of operation can be employed on a frog pan in which the tongue is normally set to curve and in which the tongue will be shifted to its straight through position with a reset to curve after the collector passes the tongue.

In Fig. 1 is shown in dotted lines, means for applying the principle involved in the use of resistance 34 and condenser 40 whereby the operation of the tongue shifting mechanism may be speeded up. Here is shown a resistance 50 in series relation with the conductor 27 and a condenser 51 connected in parallel with the resistance 50 thereby shorting the resistance for an instant and permitting a current surge through the coils 22 and 23. The portion 52 of the conductor 27 would be omitted in case of the use of the parts 50 and 51. The use of elements 50 and 51 is optional as the system will operate without them. Also the system will operate if the elements 50 and 51 are used but the relay 32, resistance 34 and condenser 40 omitted as the function and operation of the two controls described are entirely independent.

The relay 32 and members 34 and 40, also the members 50 and 51 may be used in conjunction with a frog employing two operating coils per pan as shown in U. S. Patent 2,264,839.

Contact device 28 may be shorter than contact device 29 thereby reducing weight and cost but the use of the relay switch in such case is advisable as it insures operation of the tongues.

Frogs have been proposed in which a resistance was connected in series with the operating coils and normally short-circuited by a switch which automatically opened and closed with and by the movements of the tongues, but in my invention the resistance and condenser are connected permanently in circuit, the arrangement is such as to avoid the use of any moving parts to control the current flow through the coils, as the condenser automatically controls the functioning of the resistance.

The resistance in parallel with the condenser assures full discharge of the condenser between operations of the frog.

The relative resistance of the various coils to their respective resistances and the cooperation of the condenser may vary greatly to meet different operating requirements, therefore it is quite impossible to give values therefor which will be applicable in general.

I claim:

1. In a switching system for a pair of current collectors mounted on a vehicle, in combination, a pair of main trolley wires of opposite polarity and a branch wire for each main wire, a trolley frog at the intersection of each main and branch wire and provided with a movable tongue to guide a current collector on the vehicle either along the main wire or onto the branch wire, a contact device associated with each trolley wire on the approach side of the frog to be electrically connected to their respective wires by passing current collectors, electrically operated mechanism including coils to shift the tongues, conductors connecting the coils to said contact devices, a relay including an operating coil and a contact element, conductors connecting the relay coil to the contact devices, the relay coil and the coils of the electrical mechanism being energized when the contact devices are simultaneously engaged by their respective current collectors and circuit means closed by the contact element when the relay coil is energized thereby connecting one of the contact devices to its respective trolley wire.

2. A switching system according to claim 1 in which there is included in combination with the relay coil, control means to momentarily pass a current through the relay coil at the instant of its energization sufficient to assure the rapid closing of the relay contact element and then reduce the current to a value sufficient to maintain the relay coil energized and the frog tongues in their proper guiding position without danger of the coil overheating.

3. A switching system according to claim 1 in which there is included in combination with the relay coil control means to momentarily pass a current through the relay coil at the instant of its energization sufficient to assure the rapid closing of the relay contact element and then automatically reduce the current to a value sufficient to maintain the relay coil energized and the frog tongues in their proper guiding position without danger of the relay coil overheating, the said control means comprising resistance means included in series in said conductor means and condenser means connected in shunt with the resistance means.

4. A trolley transportation system comprising, a pair of main trolley wires of opposite polarity and a branch wire from each main wire, a trolley frog at the intersection of each branch and main wire, a pair of current collectors mounted on an electrically operated vehicle, movable tongues associated with the frogs to guide the collectors along the main wires or onto the branch wires, a contact device associated with each main wire, the contact devices energizable when engaged by the current collectors, electrically operated mechanism including an operating coil for moving each tongue, conductors connecting said operating coils to both contact devices, the operating coils being energized when both contact devices are energized by the current collectors at the same time, and means to continue the energization of the coils after one current collector has passed its contact device and the other collector is still in engagement with its contact device, the said means comprising a relay including a contact element and an operating coil, conductor means connecting the relay coil to the contact devices whereby the relay coil will be energized at the same time both contact devices are energized, and circuit means so connected to said conductor means and to one trolley wire and to the relay coil and closed by the contact element when the relay coil is energized that the mechanism coils and the relay coil will remain energized as long as the said other collector is still in engagement with its contact device.

5. In an overhead switching system for a pair of current collectors mounted on a vehicle, in combination, a pair of main trolley wires of opposite polarity and a branch wire from each main wire and a trolley frog at the intersection of each main and branch wire, each frog provided with a movable tongue to guide said current collectors either along the main wires or on to the branch wires, a contact device associated with each main wire and energized from their respective trolley wires when engaged by the current collectors, electrically operated mechanism associated with the frogs to shift the tongues and conductors connecting the mechanism to the contact devices, a relay including an operating coil and a circuit closing contact element, conductor means connecting the relay coil to the contact devices whereby the said relay coil and the said mechanism will be energized while the current collectors are in engagement with both contact devices at the same time, and circuit means closed by the contact element when the relay coil is energized thereby connecting the electrically operated mechanism and relay coil to both trolley wires when only one contact device is energized by its engagement with its current collector.

6. A switching system according to claim 5 in which there is included in series with the relay coil and the conductor means, resistance means to reduce a sustained current through the relay coil to a safe value, and means associated with the resistance means to momentarily nullify its effect at the instant of the energization of the relay coil to assure the rapid closing of the relay contact element.

7. A switching system comprising, a pair of main trolley wires of opposite polarity and a branch wire from each main wire, a trolley frog at each intersection of a branch and main wire, each frog provided with a movable tongue to guide a current collector mounted on a moving vehicle through the frog, a contact device associated with each trolley wire to be electrically connected to their respective wires by the passing current collectors, electrically operated mechanism including coils to shift the tongues, a relay including an operating coil and a contact element, conductor means connecting the mechanism coils and the relay coil to the contact devices whereby the said coils will be energized when the contact devices are both in engagement with their respective current collectors at the same time, circuit means closed by the contact element when the relay coil is energized thereby connecting one of said contact devices to its respective trolley wire and control means associated with the conductor means to momentarily pass a current through the coils at the instant both contact devices are energized to assure the full and rapid energization of the coils and the rapid and positive closing of the contact element and operation of the tongues and then reducing the current through the coils to a value sufficient to maintain the coils energized and the tongues in their proper guiding position without danger of the coils overheating.

8. In a switching system for a pair of current collectors mounted on a vehicle, in combination, a pair of main trolley wires of opposite polarity and a branch wire for each main wire, a trolley frog at the intersection of each main and branch wire and provided with a movable tongue to guide a current collector on the vehicles either along the main wire or onto the branch wire, a contact device associated with each trolley wire on the approach side of the frog to be electrically connected to their respective wires by passing current collectors, electrically operated mechanism including coils to shift the tongues, conductors connecting the coils to said contact devices, a relay including an operating coil and a contact element, conductors connecting the relay coil to the contact devices whereby the relay coil and the coils of the electrical mechanism will be energized when the contact devices are simultaneously engaged by their respective current collectors, circuit means closed by the contact element when the relay coil is energized thereby connecting one of the contact devices to its respective trolley wire and control means connected in series with one of said conductors to momentarily pass a current through the coil or coils controlled by the conductor at the instant of the energization thereof to assure the rapid and positive energization of the coil or coils and then reduce the current to a value sufficient to maintain the energization of the coil or coils without danger of overheating.

9. A trolley frog for an overhead two wire system comprising, a pair of trolley frogs, each frog provided with means to receive a main and a branch wire and each frog having a movable tongue to guide a passing current collector through the frog, insulating means to maintain the frogs in spaced relation thereby forming a unitary device, electrically operated mechanism including coils to shift the tongues, the coils adapted to be connected to contact devices associated with the trolley wires and engageable by the current collectors respectively, control means including an operating coil associated with the trolley frogs adapted to be connected to said contact devices whereby the mechanism coils and the coil for the control means will be energized when both contact devices are engaged respectively at the same time by the current collectors, the said control means comprising a contact adapted to connect said coils to one trolley wire whereby the energization of the mechanism coils will be maintained as long as the contact device associated with the other of said trolley wires is energized after both contact devices have been energized.

10. A switch system according to claim 4 in which there is included in combination therewith resistance means to limit a sustained current through the said coils to a safe value and means associated with the resistance means to momentarily by-pass the resistance to assure the rapid energization of the coils and the closing of the contact element and operation of the switch tongues at the instant both contact devices are simultaneously energized.

11. A switching system according to claim 1 in which resistance is included in series with the coils of the electrically operated mechanism and the coil of the relay to reduce sustained currents through the coils to a safe value and means associated with the resistance to momentarily by-pass the resistance at the instant both collectors are in engagement at the same time with their respective contact devices to assure the rapid and sufficient energization of the coils.

WARREN J. LEWIS.